(12) United States Patent
Nasr et al.

(10) Patent No.: US 7,848,857 B2
(45) Date of Patent: Dec. 7, 2010

(54) SYSTEM AND METHOD FOR BRAKING IN AN ELECTRIC VEHICLE (75) Inventors: Nader Nasr, Neenah, WI (US); Christopher K. Yakes, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 164 days.

(21) Appl. No.: 11/929,868

(22) Filed: Oct. 30, 2007

(65) Prior Publication Data

US 2008/0059014 A1 Mar. 6, 2008

Related U.S. Application Data (60) Continuation of application No. 10/950,957, filed on Sep. 27, 2004, now Pat. No. 7,379,797, and a continuation-in-part of application No. 10/718,051, filed on Mar. 16, 2004, now Pat. No. 7,164,977, which is a continuation-in-part of application No. 10/326,862, filed on Dec. 19, 2002, now Pat. No. 6,885,920, which is a division of application No. 09/774,981, filed on Jan. 31, 2001, now Pat. No. 6,757,597.

(51) Int. Cl.
*B60L 15/00* (2006.01)

(52) U.S. Cl. ........................ 701/22; 290/40 B (58) Field of Classification Search ........... 701/22; 180/65.1, 65.3–65.8; 290/40 B, 40 C, 40 D
See application file for complete search history.

(56) References Cited

U.S. PATENT DOCUMENTS

| 1,951,089 | A |   | 3/1934  | Fielder          |
|-----------|---|---|---------|------------------|
| 3,524,069 | A |   | 8/1970  | Stepanov et al.  |
| 3,566,717 | A | * | 3/1971  | Berman et al. ......... 477/3 |
| 3,690,559 | A |   | 9/1972  | Rudloff          |
| 3,720,863 | A |   | 3/1973  | Ringland et al.  |
| 3,729,106 | A |   | 4/1973  | Barbieri         |
| 3,764,867 | A |   | 10/1973 | Smith            |
| 3,799,284 | A |   | 3/1974  | Hender           |
| 3,865,209 | A |   | 2/1975  | Aihara et al.    |

(Continued)

FOREIGN PATENT DOCUMENTS

DE 1816183 6/1970

(Continued)

OTHER PUBLICATIONS

"Advanced Wireless Technology for CAN and DeviceNet," Apr. 2003 (1 pg.).

(Continued)

*Primary Examiner*—Dalena Tran
(74) *Attorney, Agent, or Firm*—Foley & Lardner LLP (57) ABSTRACT An electric traction system for an electric vehicle includes an internal combustion engine and a generator coupled to the engine, a power bus coupled to the generator, a power storage unit coupled to the power bus, a drive controller coupled to an electric motor and to the power bus, and a vehicle controller coupled to the drive controller. The generator is configured to receive electrical power regenerated onto the power bus by the electric motor in order to provide mechanical power to the engine, and the engine is configured to dissipate the mechanical power in order to provide a braking function.

8 Claims, 3 Drawing Sheets

U.S. PATENT DOCUMENTS

| | | |
|---|---|---|
| 3,966,067 A | 6/1976 | Reese |
| 4,021,704 A | 5/1977 | Norbeck |
| 4,041,470 A | 8/1977 | Slane et al. |
| 4,088,934 A | 5/1978 | D'Atre et al. |
| 4,097,925 A | 6/1978 | Butler, Jr. |
| 4,113,045 A | 9/1978 | Downing, Jr. |
| 4,162,714 A | 7/1979 | Correll |
| 4,180,803 A | 12/1979 | Wesemeyer et al. |
| 4,196,785 A | 4/1980 | Downing |
| 4,292,531 A | 9/1981 | Williamson |
| 4,319,140 A | 3/1982 | Paschke |
| 4,336,418 A | 6/1982 | Hoag |
| 4,347,907 A | 9/1982 | Downing |
| 4,355,385 A | 10/1982 | Hampshire et al. |
| 4,423,362 A | 12/1983 | Konrad et al. |
| 4,423,794 A | 1/1984 | Beck |
| 4,444,285 A | 4/1984 | Stewart et al. |
| 4,453,880 A | 6/1984 | Leisse |
| 4,461,988 A | 7/1984 | Plunkett et al. |
| 4,516,121 A | 5/1985 | Moriyama et al. |
| 4,533,011 A | 8/1985 | Heidemeyer et al. |
| 4,542,802 A | 9/1985 | Garvey et al. |
| 4,562,894 A | 1/1986 | Yang |
| RE32,140 E | 5/1986 | Tokuda et al. |
| 4,639,609 A | 1/1987 | Floyd et al. |
| 4,646,232 A | 2/1987 | Chang et al. |
| 4,719,361 A | 1/1988 | Brubaker |
| 4,744,218 A | 5/1988 | Edwards et al. |
| 4,760,275 A | 7/1988 | Sato et al. |
| 4,774,399 A | 9/1988 | Fujita |
| 4,774,811 A | 10/1988 | Kawamura |
| 4,809,177 A | 2/1989 | Windle et al. |
| 4,809,803 A | 3/1989 | Ahern et al. |
| 4,843,557 A | 6/1989 | Ina et al. |
| 4,864,151 A | 9/1989 | Wyczalek et al. |
| 4,864,154 A | 9/1989 | Copeland et al. |
| 4,864,568 A | 9/1989 | Sato et al. |
| 4,894,781 A | 1/1990 | Sato et al. |
| 4,941,546 A | 7/1990 | Nist et al. |
| 4,949,808 A | 8/1990 | Garnett |
| 4,953,646 A | 9/1990 | Kim |
| 4,961,625 A | 10/1990 | Wood et al. |
| 4,966,242 A | 10/1990 | Baillargeon |
| 4,985,845 A | 1/1991 | Götz et al. |
| 5,025,253 A | 6/1991 | DiLullo et al. |
| 5,046,007 A | 9/1991 | McCrery et al. |
| 5,062,759 A | 11/1991 | Pieperhoff |
| 5,067,932 A | 11/1991 | Edwards |
| 5,071,307 A | 12/1991 | Carson |
| 5,081,832 A | 1/1992 | Mowill |
| 5,091,856 A | 2/1992 | Hasegawa et al. |
| 5,120,282 A | 6/1992 | Fjallstrom |
| 5,124,915 A | 6/1992 | Krenzel |
| 5,168,946 A | 12/1992 | Dorgan |
| 5,180,456 A | 1/1993 | Schultz et al. |
| 5,189,617 A | 2/1993 | Shiraishi |
| 5,195,600 A | 3/1993 | Dorgan |
| 5,201,629 A | 4/1993 | Simpson et al. |
| 5,202,830 A | 4/1993 | Tsurumiya et al. |
| 5,215,423 A | 6/1993 | Schulte-Hinsken et al. |
| 5,222,853 A | 6/1993 | Carson |
| 5,227,703 A | 7/1993 | Boothe et al. |
| 5,241,817 A | 9/1993 | George, Jr. |
| 5,263,524 A | 11/1993 | Boardman |
| 5,264,763 A | 11/1993 | Avitan |
| 5,289,093 A | 2/1994 | Jobard |
| 5,291,960 A | 3/1994 | Brandenburg et al. |
| 5,343,675 A | 9/1994 | Norton |
| 5,343,971 A | 9/1994 | Heidelberg et al. |
| 5,345,154 A | 9/1994 | King |
| 5,365,436 A | 11/1994 | Schaller et al. |
| 5,369,540 A | 11/1994 | Konrad et al. |
| 5,389,825 A | 2/1995 | Ishikawa et al. |
| 5,402,046 A | 3/1995 | Jeanneret |
| 5,409,425 A | 4/1995 | Shibahata |
| 5,416,702 A | 5/1995 | Kitagawa et al. |
| 5,418,437 A | 5/1995 | Couture et al. |
| 5,445,347 A | 8/1995 | Ng |
| 5,448,561 A | 9/1995 | Kaiser et al. |
| 5,463,992 A | 11/1995 | Swenson et al. |
| 5,470,187 A | 11/1995 | Smith et al. |
| 5,493,490 A | 2/1996 | Johnson |
| 5,504,655 A | 4/1996 | Underwood et al. |
| 5,508,594 A | 4/1996 | Underwood et al. |
| 5,508,689 A | 4/1996 | Rado et al. |
| 5,516,379 A | 5/1996 | Schultz |
| 5,538,274 A | 7/1996 | Schmitz et al. |
| 5,540,037 A | 7/1996 | Lamb et al. |
| 5,555,171 A | 9/1996 | Sonehara et al. |
| 5,557,257 A | 9/1996 | Gieffers |
| 5,558,588 A | 9/1996 | Schmidt |
| 5,558,589 A | 9/1996 | Schmidt |
| 5,558,595 A | 9/1996 | Schmidt |
| 5,568,023 A | 10/1996 | Grayer et al. |
| 5,575,730 A | 11/1996 | Edwards et al. |
| 5,575,737 A | 11/1996 | Weiss |
| 5,586,613 A | 12/1996 | Ehsani |
| 5,589,743 A | 12/1996 | King |
| 5,592,375 A | 1/1997 | Salmon et al. |
| 5,601,392 A | 2/1997 | Smith et al. |
| 5,619,412 A | 4/1997 | Hapka |
| 5,623,169 A | 4/1997 | Sugimoto et al. |
| 5,629,567 A | 5/1997 | Kumar |
| 5,629,603 A | 5/1997 | Kinoshita |
| 5,636,122 A | 6/1997 | Shah et al. |
| 5,637,933 A | 6/1997 | Rawlings et al. |
| 5,638,272 A | 6/1997 | Minowa et al. |
| 5,646,510 A | 7/1997 | Kumar |
| 5,657,224 A | 8/1997 | Lonn et al. |
| 5,669,470 A | 9/1997 | Ross |
| 5,670,845 A | 9/1997 | Grant et al. |
| 5,672,920 A | 9/1997 | Donegan et al. |
| 5,679,085 A | 10/1997 | Fredriksen et al. |
| 5,732,074 A | 3/1998 | Spaur et al. |
| 5,736,925 A | 4/1998 | Knauff et al. |
| 5,739,592 A | 4/1998 | Rigsby et al. |
| 5,754,021 A | 5/1998 | Kojima |
| 5,767,584 A | 6/1998 | Gore et al. |
| 5,788,597 A | 8/1998 | Boll et al. |
| 5,793,648 A | 8/1998 | Nagle et al. |
| 5,794,165 A | 8/1998 | Minowa et al. |
| 5,812,959 A | 9/1998 | Froeburg et al. |
| 5,813,487 A | 9/1998 | Lee et al. |
| 5,813,488 A | 9/1998 | Weiss |
| 5,815,126 A | 9/1998 | Fan et al. |
| 5,819,188 A | 10/1998 | Vos |
| 5,819,201 A | 10/1998 | DeGraaf |
| 5,820,150 A | 10/1998 | Archer et al. |
| 5,827,957 A | 10/1998 | Wehinger |
| 5,828,554 A | 10/1998 | Donegan |
| 5,838,251 A | 11/1998 | Brinkmeyer et al. |
| 5,844,473 A | 12/1998 | Kaman |
| 5,845,221 A | 12/1998 | Hosokawa et al. |
| 5,847,520 A | 12/1998 | Theurillat et al. |
| 5,848,365 A | 12/1998 | Coverdill |
| 5,851,100 A | 12/1998 | Brandt |
| 5,856,976 A | 1/1999 | Hirano |
| 5,864,781 A | 1/1999 | White |
| 5,879,265 A | 3/1999 | Bek |
| 5,880,570 A | 3/1999 | Tamaki et al. |
| 5,881,559 A | 3/1999 | Kawamura |
| 5,884,206 A | 3/1999 | Kim |
| 5,890,080 A | 3/1999 | Coverdill et al. |
| 5,890,865 A | 4/1999 | Smith et al. |

| Patent No. | Date | Inventor |
|---|---|---|
| 5,895,454 A | 4/1999 | Harrington |
| 5,896,418 A | 4/1999 | Hamano et al. |
| 5,913,210 A | 6/1999 | Call |
| 5,918,180 A | 6/1999 | Dimino |
| 5,919,237 A | 7/1999 | Balliet |
| 5,922,040 A | 7/1999 | Prabhakaran |
| 5,924,879 A | 7/1999 | Kameyama |
| 5,925,993 A | 7/1999 | Lansberry |
| 5,928,291 A | 7/1999 | Jenkins et al. |
| 5,930,742 A | 7/1999 | Dodd et al. |
| 5,939,794 A | 8/1999 | Sakai et al. |
| 5,942,879 A | 8/1999 | Ibraki |
| 5,945,919 A | 8/1999 | Trask |
| 5,947,855 A | 9/1999 | Weiss |
| 5,948,025 A | 9/1999 | Sonoda |
| 5,949,330 A | 9/1999 | Hoffman et al. |
| 5,950,144 A | 9/1999 | Hall et al. |
| 5,954,470 A | 9/1999 | Duell et al. |
| 5,957,985 A | 9/1999 | Wong et al. |
| 5,973,463 A | 10/1999 | Okuda et al. |
| 5,986,416 A | 11/1999 | Dubois |
| 5,987,365 A | 11/1999 | Okamoto |
| 5,995,898 A | 11/1999 | Tuttle |
| 5,997,338 A | 12/1999 | Pohjola |
| 5,998,880 A | 12/1999 | Kumar |
| 5,999,104 A | 12/1999 | Symanow et al. |
| 6,005,358 A | 12/1999 | Symanow et al. |
| 6,012,004 A | 1/2000 | Sugano et al. |
| 6,028,403 A | 2/2000 | Fukatsu |
| 6,033,041 A | 3/2000 | Koga et al. |
| 6,038,500 A | 3/2000 | Weiss |
| 6,041,310 A | 3/2000 | Green et al. |
| 6,054,844 A | 4/2000 | Frank |
| 6,065,565 A | 5/2000 | Puszkiewicz et al. |
| 6,070,538 A | 6/2000 | Flamme et al. |
| 6,088,650 A | 7/2000 | Schipper et al. |
| 6,096,978 A | 8/2000 | Pohjola |
| 6,104,148 A | 8/2000 | Kumar et al. |
| 6,105,984 A | 8/2000 | Schmitz et al. |
| 6,112,152 A | 8/2000 | Tuttle |
| 6,121,740 A * | 9/2000 | Gale et al. .................. 318/376 |
| 6,123,497 A | 9/2000 | Duell et al. |
| 6,125,356 A | 9/2000 | Brockman et al. |
| 6,135,806 A | 10/2000 | Pohjola |
| 6,141,608 A | 10/2000 | Rother |
| 6,141,610 A | 10/2000 | Rothert et al. |
| 6,152,673 A | 11/2000 | Anderson et al. |
| 6,154,122 A | 11/2000 | Menze |
| 6,154,658 A | 11/2000 | Caci |
| 6,157,889 A | 12/2000 | Baker |
| 6,170,587 B1 * | 1/2001 | Bullock ...................... 180/69.6 |
| 6,181,994 B1 | 1/2001 | Colson et al. |
| 6,182,807 B1 | 2/2001 | Saito et al. |
| 6,208,948 B1 | 3/2001 | Klingler et al. |
| 6,219,626 B1 | 4/2001 | Steinmetz et al. |
| 6,223,104 B1 | 4/2001 | Kamen et al. |
| 6,230,496 B1 | 5/2001 | Hofman et al. |
| 6,232,874 B1 | 5/2001 | Murphy |
| 6,240,365 B1 | 5/2001 | Bunn |
| 6,243,628 B1 | 6/2001 | Bliley et al. |
| 6,244,758 B1 | 6/2001 | Solymar et al. |
| 6,246,320 B1 | 6/2001 | Monroe |
| 6,256,580 B1 | 7/2001 | Meis et al. |
| 6,263,268 B1 | 7/2001 | Nathanson |
| 6,263,269 B1 | 7/2001 | Dannenberg |
| 6,269,295 B1 | 7/2001 | Gaugush et al. |
| 6,281,790 B1 | 8/2001 | Kimmel et al. |
| 6,285,932 B1 | 9/2001 | De Bellefeuille et al. |
| 6,298,932 B1 | 10/2001 | Bowman et al. |
| 6,331,365 B1 | 12/2001 | King |
| 6,332,745 B1 | 12/2001 | Duell et al. |
| 6,338,010 B1 | 1/2002 | Sparks et al. |
| 6,356,826 B1 | 3/2002 | Pohjola |
| 6,370,454 B1 | 4/2002 | Moore |
| 6,387,007 B1 | 5/2002 | Fini, Jr. |
| 6,404,607 B1 | 6/2002 | Burgess et al. |
| 6,405,114 B1 | 6/2002 | Priestley et al. |
| 6,421,593 B1 | 7/2002 | Kempen et al. |
| 6,429,773 B1 | 8/2002 | Schuyler |
| 6,430,164 B1 | 8/2002 | Jones et al. |
| 6,430,488 B1 | 8/2002 | Goldman et al. |
| 6,434,512 B1 | 8/2002 | Discenzo |
| 6,466,258 B1 | 10/2002 | Mogenis et al. |
| 6,486,568 B1 * | 11/2002 | King et al. .................... 307/66 |
| 6,487,717 B1 | 11/2002 | Brunemann et al. |
| 6,496,393 B1 | 12/2002 | Patwardhan |
| 6,496,775 B2 | 12/2002 | McDonald et al. |
| 6,501,368 B1 | 12/2002 | Wiebe et al. |
| 6,501,386 B2 | 12/2002 | Lehrman et al. |
| 6,522,955 B1 | 2/2003 | Colburn |
| 6,542,077 B2 | 4/2003 | Joao |
| 6,549,827 B1 | 4/2003 | Yen |
| 6,553,290 B1 | 4/2003 | Pillar |
| 6,580,593 B2 | 6/2003 | Balakrishman |
| 6,580,953 B1 | 6/2003 | Wiebe et al. |
| 6,609,108 B1 | 8/2003 | Pulliam et al. |
| 6,611,116 B2 | 8/2003 | Bachman et al. |
| 6,611,740 B2 | 8/2003 | Lowrey et al. |
| 6,611,755 B1 | 8/2003 | Coffee et al. |
| 6,615,186 B1 | 9/2003 | Kolls |
| 6,636,790 B1 | 10/2003 | Lightner et al. |
| 6,694,234 B2 | 2/2004 | Lockwood et al. |
| 6,722,458 B2 | 4/2004 | Hofbauer |
| 6,757,597 B2 | 6/2004 | Yakes et al. |
| 6,798,344 B2 | 9/2004 | Faulkner et al. |
| 6,882,917 B2 | 4/2005 | Pillar et al. |
| 6,885,920 B2 | 4/2005 | Yakes et al. |
| 6,909,944 B2 | 6/2005 | Pillar et al. |
| 6,917,288 B2 | 7/2005 | Kimmel et al. |
| 6,922,615 B2 | 7/2005 | Pillar et al. |
| 6,993,421 B2 | 1/2006 | Pillar et al. |
| 7,006,902 B2 | 2/2006 | Archer et al. |
| 7,024,296 B2 | 4/2006 | Squires et al. |
| 2001/0016797 A1 | 8/2001 | Ogura et al. |
| 2001/0034573 A1 | 10/2001 | Morgan et al. |
| 2001/0034656 A1 | 10/2001 | Lucas et al. |
| 2001/0044769 A1 | 11/2001 | Chaves |
| 2002/0005304 A1 | 1/2002 | Bachman et al. |
| 2002/0010643 A1 | 1/2002 | Chaves |
| 2002/0015354 A1 | 2/2002 | Buckelew |
| 2002/0041229 A1 | 4/2002 | Satoh et al. |
| 2002/0045507 A1 | 4/2002 | Bowen |
| 2002/0049523 A1 | 4/2002 | Diaz et al. |
| 2002/0065594 A1 | 5/2002 | Squires et al. |
| 2002/0065707 A1 | 5/2002 | Lancaster et al. |
| 2002/0107833 A1 | 8/2002 | Kerkinni |
| 2002/0111725 A1 | 8/2002 | Burge |
| 2002/0123832 A1 | 9/2002 | Gotvall et al. |
| 2002/0133273 A1 | 9/2002 | Lowrey et al. |
| 2003/0001736 A1 | 1/2003 | Lewis |
| 2003/0031543 A1 | 2/2003 | Elbrink |
| 2003/0046179 A1 | 3/2003 | Anabtawi et al. |
| 2003/0071780 A1 | 4/2003 | Vincent et al. |
| 2003/0080619 A1 | 5/2003 | Bray et al. |
| 2003/0081123 A1 | 5/2003 | Rupe |
| 2003/0105565 A1 | 6/2003 | Loda et al. |
| 2003/0105566 A1 | 6/2003 | Miller |
| 2003/0114965 A1 | 6/2003 | Fiechter et al. |
| 2003/0130765 A1 | 7/2003 | Pillar et al. |
| 2003/0144011 A1 | 7/2003 | Richards et al. |
| 2003/0158635 A1 | 8/2003 | Pillar et al. |
| 2003/0158638 A1 | 8/2003 | Yakes et al. |
| 2003/0158640 A1 | 8/2003 | Pillar et al. |
| 2003/0163228 A1 | 8/2003 | Pillar et al. |
| 2003/0163229 A1 | 8/2003 | Pillar et al. |
| 2003/0163230 A1 | 8/2003 | Pillar et al. |

| | | | |
|---|---|---|---|
| 2003/0163233 A1 | 8/2003 | Song et al. |
| 2003/0171854 A1 | 9/2003 | Pillar et al. |
| 2003/0182034 A1 | 9/2003 | Katagishi et al. |
| 2003/0195680 A1 | 10/2003 | Pillar |
| 2003/0200015 A1 | 10/2003 | Pillar |
| 2003/0205422 A1 | 11/2003 | Morrow et al. |
| 2003/0230443 A1 | 12/2003 | Cramer et al. |
| 2003/0233178 A1 | 12/2003 | Sinex |
| 2004/0002794 A1 | 1/2004 | Pillar et al. |
| 2004/0019414 A1 | 1/2004 | Pillar et al. |
| 2004/0021569 A1 | 2/2004 | Lepkofker et al. |
| 2004/0023635 A1 | 2/2004 | Impson et al. |
| 2004/0024501 A1 | 2/2004 | Squires et al. |
| 2004/0024502 A1 | 2/2004 | Squires et al. |
| 2004/0039502 A1 | 2/2004 | Wilson et al. |
| 2004/0039504 A1 | 2/2004 | Coffee et al. |
| 2004/0039510 A1 | 2/2004 | Archer et al. |
| 2004/0055802 A1 | 3/2004 | Pillar et al. |
| 2004/0069865 A1 | 4/2004 | Rowe et al. |
| 2004/0070515 A1 | 4/2004 | Burkley et al. |
| 2004/0133319 A1 | 7/2004 | Pillar et al. |
| 2004/0133332 A1 | 7/2004 | Yakes et al. |
| 2004/0199302 A1 | 10/2004 | Pillar et al. |
| 2004/0203974 A1 | 10/2004 | Seibel |
| 2005/0004733 A1 | 1/2005 | Pillar et al. |
| 2005/0038934 A1 | 2/2005 | Gotze et al. |
| 2005/0040939 A1 | 2/2005 | Jobes, I et al. |
| 2005/0054351 A1 | 3/2005 | McAlexander |
| 2005/0060246 A1 | 3/2005 | Lastinger et al. |
| 2005/0060256 A1 | 3/2005 | Lastinger et al. |
| 2005/0113988 A1 | 5/2005 | Nasr et al. |
| 2005/0113996 A1 | 5/2005 | Pillar et al. |
| 2005/0114007 A1 | 5/2005 | Pillar et al. |
| 2005/0119806 A1 | 6/2005 | Nasr et al. |
| 2005/0128431 A1 | 6/2005 | Jannard et al. |
| 2005/0131600 A1 | 6/2005 | Quigley et al. |
| 2005/0209747 A1 | 9/2005 | Yakes et al. |
| 2005/0234622 A1 | 10/2005 | Pillar et al. |

FOREIGN PATENT DOCUMENTS

| | | |
|---|---|---|
| DE | 41 11 865 A1 | 10/1991 |
| DE | 40 41 483 A1 | 6/1992 |
| DE | 4108647 A1 | 9/1992 |
| DE | 4431929 C1 | 10/1995 |
| DE | 19749074 A1 | 5/1999 |
| DE | 199 29 434 A1 | 12/2000 |
| DE | 101 03 922 A1 | 8/2002 |
| EP | 0 266 704 B1 | 5/1988 |
| EP | 0 504 913 A1 | 9/1992 |
| EP | 0 564 943 B1 | 10/1993 |
| EP | 0 496 302 B1 | 6/1994 |
| EP | 622 264 A2 | 11/1994 |
| EP | 0 630 831 A1 | 12/1994 |
| EP | 805 059 B1 | 3/1997 |
| EP | 812 720 B1 | 6/1997 |
| EP | 0 791 506 A2 | 8/1997 |
| EP | 0 622 264 B1 | 11/1998 |
| EP | 0 894 739 A1 | 2/1999 |
| EP | 0 898 213 A1 | 2/1999 |
| EP | 898 213 A1 | 2/1999 |
| EP | 0 949 122 A2 | 10/1999 |
| EP | 1 018 451 A1 | 7/2000 |
| EP | 0 805 059 B1 | 8/2000 |
| EP | 1 087 343 A1 | 3/2001 |
| EP | 1 092 406 A2 | 4/2001 |
| EP | 1 115 264 A2 | 7/2001 |
| EP | 0812720 B1 | 12/2001 |
| EP | 1 229 636 A2 | 8/2002 |
| FR | 2658259 A1 | 2/1990 |
| GB | 1308318 | 6/1969 |
| GB | 2 263 376 A | 7/1993 |
| GB | 2302850 A | 6/1996 |
| JP | 60 008132 A | 1/1985 |
| JP | 60-216703 A | 10/1985 |
| JP | 2000-333160 A | 11/2000 |
| SE | 507046 C2 | 3/1998 |
| WO | WO-93/10951 A1 | 6/1993 |
| WO | WO-95/015594 A1 | 6/1995 |
| WO | WO 96/32346 A1 | 10/1996 |
| WO | WO 96/40573 A1 | 12/1996 |
| WO | WO-97/002965 A1 | 1/1997 |
| WO | WO-98/19875 A1 | 5/1998 |
| WO | WO 98/30961 A1 | 7/1998 |
| WO | WO-98/030961 A1 | 7/1998 |
| WO | WO-99/023783 A2 | 5/1999 |
| WO | WO-00/069662 A1 | 11/2000 |
| WO | WO-00/079727 A2 | 12/2000 |
| WO | WO-01/015001 A2 | 3/2001 |
| WO | WO-01/54939 A2 | 8/2001 |
| WO | WO-03/055714 A1 | 7/2003 |
| WO | WO-03/059455 A2 | 7/2003 |
| WO | WO-03/059455 A3 | 7/2003 |
| WO | WO-03/060831 A2 | 7/2003 |
| WO | WO-03/060831 A3 | 7/2003 |
| WO | WO-03/061235 A2 | 7/2003 |
| WO | WO-03/061235 A3 | 7/2003 |
| WO | WO-03/93046 A2 | 11/2003 |
| WO | WO-03/93046 A3 | 11/2003 |
| WO | WO 2004/052756 A1 | 6/2004 |
| WO | WO 2005/030614 A1 | 4/2005 |

OTHER PUBLICATIONS

"AssetVision Brochure," printed on Aug. 8, 2001 (3 pgs.).

"AssetVision Product Specification," Wireless Link, Revision Date: May 18, 1999 (63 pgs.).

Bose, B.K. et al., "High Frequency AC vs. DC Distribution System for Next Generation Hybrid Electric Vehicle"; Industrial Electronics, Control and Instrumentation, 1996: Proceedings of the 1996 IEEE IECON 22$^{nd}$ International Conference on Taipei, Taiwan; Aug. 5-10, 1996, New York, NY; pp. 706-712.

"CarPort—The Only Link Between the Auto and the PC," Vetronix Corporation, printed on Jul. 30, 2003 (1 pg.).

"CarPort User's Guide Version 1.0," Vetronix Corporation, Nov. 1999 (40 pgs.).

"Dana Spicer Central Tire Inflation System Specifications," Dana Corporation, Kallamazoo, Michigan, May 2000 (2 pgs.).

"HEMTT—Heavy Expanded Mobility Tactical Truck M977 Series Truck," Product of Oshkosh Truck Corporation, Mar. 2000 (12 pgs. as potocopied).

High Frequency AC vs. DC Distribution System for Next Generation Hybrid Electric Vehicle 1996 IEEE.

High Power Density Electrical Drive for An Hybrid Electric Vehicle 1998 IEEE.

"LHS Decontamination Mission Module," Product of Oshkosh Truck Corporation, see IDS for date (2 pgs. as photocopied).

"LVS—Logistic Vehicle System (MK48 Series)," Product of Oshkosh Truck Corporation, see IDS for date information (6 pgs.).

"M1070F Heavy Equipment Transporter & Trailer"; Product of Oshkosh Truck Corporation, Sep. 2001 (8 pgs. as photocopied).

"M1977 CBT (Common Bridge Transporter)," Product of Oshkosh Truck Corporation, see IDS for date information (2 pgs. as photocopied).

"Medium Tactical Vehicle Replacement," Product of Oshkosh Truck Corporation, Aug. 2000 (6 pgs. as photocopied).

"MTVR Dump Body Variant (Medium Tactical Vehicle Replacement)," Product of Oshkosh Truck Corporation, Sep. 2001 (2 pgs. as photocopied).

"MTVR Wrecker Variant (MK36 Wrecker Recovery Vehicle)," Product of Oshkosh Truck Corporpation, Sep. 2001 (2 pgs. as photocopied).

Namduri, C.S. et al., "High Power Density Electric Drive for an Hybrid Electric Vehicle," Applied Power Electronics Conference and Exposition, 1998. APEC '98. Conference Proceedings 1998, 13th Annual; Anaheim, CA, Feb. 15-19, 1998: New York, New York, IEEE, Feb. 15, 1998, pp. 34-40; ISBN: 0-7803-4340-9/98.
"Onboard Computer—Mobius TTS Smarter Mobile Logistics on the Road," Cadec Corporation, Londonderry, NH, estimated date obtained of Aug. 8, 2001 (4 pgs.).
"Oshkosh Demonstrates ProPulse, the First Electric Hybrid—Drive Heavy Defense Truck," Oshkosh Truck Corp., Feb. 27, 2000 (2 pgs.).
"Oshkosh Receives Federal Government Funding to Develop ProPulse Alternative Drive System for Military Turcks," Oshkosh Truck Corp., Aug. 31, 2001 (2 pgs.).
"Oshkosh Showcases ProPulse Hybrid Electric System at Major Defense Exhibition," Oshkosh Truck Corp., Oct. 21, 2002 (1 pg.).
"Oshkosh Truck and Ohio State University Design Robotic Vehicle to Compete in Desert Race," Oshkosh Truck Corp., Feb. 11, 2004 (2 pgs.).
"Oshkosh Truck Awarded Contract for U.S. Army Future Tactical Truck Concepts and Technology Evaluations," Oshkosh Truck Corp., Dec. 2, 2003 (2 pgs.).
"Oshkosh Truck Rolls Out Next Generation of Command Zone Advanced Electronics System to Military Market," Oshkosh Truck Corp., Oct. 21, 2002 (2 pgs.).
"Oshkosh Trucks—75 Years of Specialty Truck Production," Wright et al., Motorbooks International Publishers & Wholesalers, 1992, pp. 119-126 (10 pgs.).
"Oshkosh Truck's Robotic Truck Qualifies for Pentagon's $1 Million Desert Race," Oshkosh Truck Corp., Mar. 12, 2004 (2 pgs.).
"Palletized Load System (PLS)—Concrete Mobile Mixer Module," Product of Oshkosh Truck Corporation, see IDS for date information (2 pgs.).
"Palletized Load System (PLS)—Potable Water Distributor Module," Product of Oshkosh Truck Corporation, see IDS for date information (2 pgs.).
Rajashekara, K.; "History of Electric Vehicles in General Motors"; Industry Applications Society Annual Meeting, 1993; Conference Record of 1993 IEEE Toronto, Ontario, Canada; Oct. 2-8, 1993; ISBN: 0-7803-1462-X; pp. 447-454.
STE/ICE-R Design Guide for Vehicle Diagnostic Connector Assemblies, Report No. CR-82-588-003 REV Feb. 1, 1988, 182 pgs.
"Televisant Fleet Management—The Concrete Solution," Trimble Navigation Limited, Mar. 2002 (2 pgs.).
"Televisant Ready Mix Industry Plan: maximize your ready mix fleet operation," 2003 (2 pgs.).
"The One to Count on Through Hell and High Water," Product of Oshkosh Truck Corporation, Sep. 2000 (4 pgs.).
"Trimble and McNeilus Enhance Televisant Fleet Management System for the Ready Mix Market," Feb. 4, 2003 (2 pgs.).
"Trimble and McNeilus Form Alliance to Factory-Install Fleet Management Solutions on Ready Mix Concrete Trucks," Mar. 19, 2002 (2 pgs.).
"Vehicle Internet Port (VIP)—Internet Access System for AutoPC," Vetronix Coporation, printed on Jul. 20, 2003 (1 pg.).
"Vehicle Internet Port (VIP) System Description," Vetronix Corporation, printed on Jul. 30, 2003 (2 pgs.).
"Wireless CAN Bridge CB-300," Matric, Apr. 10, 2002 (20 pgs.).
"WirelessRoad Fleet Management System," Vetronix Corporation, printed on Jul. 30, 2003 (2 pgs.).
"WirelessRoad Frequently Asked Questions," Vetronix Corporation, printed on Jul. 30, 2003 (2 pgs.).
"WirelessRoad System Description," Vetronix Corporation, printed on Jul. 30, 2003 (5 pgs.).
Aircraft Internal Time Division Multiplex Data Bus, MIL-STD-1553 (USAF), Aug. 30, 1973 (29 pgs.).
Barraco Klement, M.A., "Agile Support Project—Global Hawk Program," Jan-Feb 1999, pp. 66-70 (5 pgs.).
Caterpillar, "Technology Products," printed on Aug. 8, 2001 (2 pgs.).
Computer Diagnoses Vehicle Deficiencies, Sgt. Shawn Woodard, Fort Jackson Leader, Jul. 26, 2002 (2 pgs.).
Construction, "Equipment Trackin-A New Asset Management Method"; Equipment Today, Oct. 1999 (3 pgs.).
Dearborn Group Technology, "Dearborn Group Puts Wireless Vehicle Connectivity in Customers' Hands," Mar. 3, 2001 (3 pgs.).
Dick Smith and Russ Walker, "Coming to a multiplex near you," WasteAge.com, Fire Chief, Feb. 1, 2003 (5 pgs.).
DriverTech—Features, DriverTech, Inc., printed on Jul. 29, 2003 (1 pg.).
DriverTech—Functional Specifications, DriverTech Inc., printed on Jul. 29, 2003 (5 pgs.).
DriverTech—Hardware & Software, DriverTech, Inc., printed on Jul. 29, 2003 (3 pgs.).
DriverTech—Wireless IP-Based Fleet Management System, DriverTech, Inc., printed on Jul. 29, 2003 (2 pgs.).
European Search Report, European Patent Application No. 02001052.6 entitled "A/C Bus Assembly for Electronic Traction Vehicle," Aug. 21, 2003 (5 pages). Electric.
FAQ, "Global Asset Monitoring," MobileNet; printed on Aug. 8, 2001, copyright marked as 1999 (2 pgs.).
Griffin, Jeff, Rental, "Look, up in the sky . . . it's . . . it's a . . . fleet management satellite!" American Rental Association, MobileNet, printed on Aug. 8, 2001, copyright marked 2000 (4 pgs.).
HGI Wireless Inc. HGI Wireless Products and Services, "Product and Services," HGI Wireless Inc.; printed on Aug. 8, 2001, copyright marked as 2001 (2 pgs.).
Home Page, "An Introduction to InterTrak," InterTrak Tracking Services, LLC., printed on Aug. 8, 2001, copyright marked as 2001 (3 pgs.).
I.D. Systems| Products Gallery, "The I.D. Systems Product Gallery," I.D. Systems, Inc., printed on Aug. 8, 2001 (3 pgs.).
IBM Press room, "IBM ServiceAfterSales Solutions Open Lucrative New Customer Service Markets For Manufacturers And Service Organizations," Press Release, White Plains, NY, Jun. 26, 2001 (2 pgs.).
Interests, "Global Remote Asset Monitoring," MobileNet, printed on Aug. 8, 2001, copyright marked 2000 (2 pgs.).
International Search Report for Application No. PCT/US2005/034802, mailing date Jan. 2, 2006, 10 pgs.
International Search Report and Written Opinion, PCT/US2004/031216, Oct. 31, 2005 (13 pgs.).
International Search Report, International Application No. PCT/US03/13177 entitled "Hybrid Vehicle with Combustion Engine/Electric Motor Drive", Date of Mailing: May 12, 2003 (7 pages). Electric Vehicle.
International Search Report for Application PCT/US03/40103; mailed May 24, 2004 (10 pages).
International Search Report for Application PCT/US02/41368, May 15, 2003.
Introduction, (Re: WDF Rimer, 7 pg. document, printed on Aug. 8, 2001, Internet www.wispinc.com/Faq/primer.htm (7 pgs.).
J.S. Mussaf, "The Space Shuttle Clickable Map," Retrieved from the Internet: http://web.archive.org/web/2001040101, Apr. 1, 2001 (24 pgs.).
Khan, I.A., "Automotive Systems: Architecture and Components"; Digital Avionics Systems Conference, 1999, IEEE, pp. 8.C.5-1-8.C.5-10.
Luka, J and Stubhan, F, "Mobile Diagnosis," Vehicle Electronics Conference, 1999 (IVEC 99), proceedings of the IEEE International Changchun, China, Sep. 6-9, 1999 (6 pgs.).
Miltope Recieves $13.5 Million Order for SPORT, Montgomery, AL, Jan. 25, 2000 (1 pg.).
Miltope Recieves $16 Million Defense System Integration Award, PRNewswire, Mar. 26, 2000 (1 pg.).
Mobile Workstation, "MobileNet Mobile Workstation," printed on Aug. 8, 2001, copyright marked 2000 (2 pgs.).
MobilEmail, "MobileNet MobilEmail," printed on Aug. 8, 2001, copyright marked 2000 (2 pgs.).
Nathanson M., "Vehicle Intelligence and Remote Wireless OBD," SAE Technical Paper, Dec. 4-6, 2000 (15 pgs.).
Nissan Moter Phils., Inc., "Client: Nissan Motor Philippines, Inc. Project," RADIX Systems Service Corporation, pinted on Aug. 8, 2001, copyright marked 2000 (1 pg.).
Products—CMS Products, "CMS Products," Cadec Corporation, printed on Aug. 8, 2001, copyright marked 2001 (6 pgs.).
Products - Mobius TTS, "Mobius TTS / Onboard Computer," Cadec Corporation, printed on Aug. 8, 2001, copyright marked 2001 (2 pgs.).
Products—Mobius TTS, "Mobius TTS," Cadec Corporation, printed on Aug 8, 2001, copyright marked 2001 (3 pgs.).

Products—Overview, "Overview—The Right Stuff for 25 Years," Cadec Corporation, printed on Aug. 8, 2001, copyright marked 2001 (2 pgs.).
Products, "MobileNet Products," printed on Aug. 8, 2001, copyright marked 2000 (2 pgs.).
Reizner, S. and Schleicher, M., "Options and risks—PDAs in the automotive area," Aug. 2001 (3 pgs.).
RM CANview Bluetooth/TCP/IP, RM Michaelides Software & Electronic Corp., Nov. 19, 2002 (2 pgs.).
Skibinski, J. et al., "Internet-based Vehicle Communication Network," SAE Technical Paper Series, Dec. 4-6, 2000 (8 pgs.).
SPORT Ad and Technical Specifications Sheet, Miltope Corporation, see IDS for date information (2 pgs.).
STE/ICE-R Design Guide for Vehicle Diagnostic Connector Assemblies, Report No. CR-82-588-003 REV 1 Feb. 1988 (182 pgs.).
Technology Products—MineStar, "Minestar," Caterpillar, printed on Aug. 8, 2001 (2 pgs.).
Technology Products—VIMS, "Technology Products," Caterpillar, printed on Aug. 8, 2001 (2 pgs.).
Telematics Diagram, Vetronix Corporation, printed on Jul. 30, 2003 (1 pg.).
Top 100, "Construction Equipment's editors pick the 100 most significant product introductions of the year," Construction Equipment Magazine, Dec. 1999 (1 pg.).
TrakPak2000, "The TrakPak 2000—A Self-Contained Mobile Tracking Unit," printed on Aug. 8, 2001, copyright marked 2000 (2 pgs.).
Trimble Information Services, "Trimble Information Services Power the Transformation of Location Data . . . into Location Information" printed on Aug. 8, 2001 (4 pgs.).
Vermeer Deal, "MobileNet asset monitoring system selected by Vermeer Manufacturing Company," Alpharetta, GA, Nov. 1, 1999 (2 pgs.).
Welcome to Modular Mining Systems, Inc.— Products, "Products—Dispatch Systems for Open Pit Mines," printed on Aug. 8, 2001, copyright marked 1996-2001 (1 pg.).
Welcome to Modular Mining Systems, Inc.—Products, "Products—Vehicle Health Systems (VHS)," printed on Aug. 8, 2001 (1 pg.).
Wireless Link Corporation—News Room, "CSI Wireless Receives $7M Order from InterTrak," Jan. 9, 2001 (3 pgs.).

Annex to Form PCT/ISA/206 Communication Relating to the Results of the Partial International Search, International Application No. PCT/US02/40760, mailed Oct. 13, 2003.
'Customer Applications'; "Benefits of Monitoring and Tracking of Heavy Equipment:"; 2 pg. document; © 2000 MobileNet; [printed from Internet www.mobile-net.com/custapp.htm]; [Page dated Aug. 8, 2001].
'Products': "MobileNet products"; 2 pg. document; © 2000 MobileNet; [printed from Internet www.mobile-net.com/products.htm]; [Page dated Aug. 8, 2001].
European Patent Organization, Examination Report for application No. 05800867.3, mailed Feb. 22, 2008, 6 pgs.
Advisory Action for U.S. Appl. No. 10/972,085, mail date Sep. 1, 2009, 3 pages.
Instruction and Parts Manual, Machine type: GCB 1000 SPLIT, May 23, 2002, 80 pages, Geesink Norba Group.
Instruction and Parts Manual, Machine type: GPM IIe, Jul. 10, 2002, 74 pages, Geesink Norba Group.
Instruction Manual for the Training AS-i bus, Aug. 2002, 31 pages, Version 3.0, Geesink Norba Group.
Notice of Allowance for U.S. Appl. No. 10/950,957, mail date Dec. 31, 2007, 5 pages.
Office Action for EP Application No. 05800867.3, mail date Oct. 27, 2009, 6 pages.
Office Action for U.S. Appl. No. 10/950,957, mail date Jan. 11, 2007, 11 pages.
Office Action for U.S. Appl. No. 10/950,957, mail date Jul. 16, 2007, 11 pages.
Office Action for U.S. Appl. No. 10/950,957, mail date Sep. 7, 2006, 10 pages.
Office Action for U.S. Appl. No. 10/972,085, mail date Jun. 19, 2009, 14 pages.
Office Action for U.S. Appl. No. 10/972,085, mail date Nov. 25, 2008, 16 pages.
Office Action with English translation for CN Application No. 2005800392914, dated Apr. 10, 2009, 12 pages.
Office Action with English translation for CN Application No. 2005800392914, dated Sep. 25, 2009, 12 pages.

* cited by examiner

SYSTEM AND METHOD FOR BRAKING IN AN ELECTRIC VEHICLE

CROSS-REFERENCE TO RELATED PATENT APPLICATIONS

This application is a continuation of U.S. application Ser. No. 10/950,957, entitled "System and Method for Braking in an Electric Vehicle," filed Sep. 27, 2004, pending, which is a continuation-in-part of: (1) U.S. application Ser. No. 10/718,051, entitled "A/C Bus Assembly for Electronic Traction Vehicle," filed on Mar. 16, 2004, now U.S. Pat. No. 7,164,977, which is a Divisional of U.S. application Ser. No. 09/774,981, "A/C Bus Assembly for Electronic Traction Vehicle," filed on Jan. 31, 2001, now U.S. Pat. No. 6,757,597 and (2) U.S. application Ser. No. 10/326,862, entitled "Control System and Method for Electric Vehicle," filed on Dec. 19, 2002, now U.S. Pat. No. 6,885,920, all of which are hereby incorporated by reference.

FIELD

The present invention relates generally to the field of electric vehicles and more specifically to systems and methods for providing braking capability in electric vehicles.

BACKGROUND

An electric traction vehicle is a vehicle that uses electricity in some form or another to provide all or part of the propulsion of the vehicle. This electricity can come from a variety of sources, such as stored energy devices relying on chemical conversions (batteries) to create electrical energy, stored energy devices relying on stored electrical charge (capacitors), stored energy devices relying on mechanical stored energy (e.g., flywheels, pressure accumulators), and energy conversion products. In a typical conventional electric traction vehicle, a prime mover, such as a diesel engine, is used to drive an electric generator or alternator which supplies electric current to one or more traction motors. The traction motors typically are coupled to wheel sets on the vehicle. A typical vehicle that utilizes this type of electric traction is a railroad locomotive. In some conventional electric traction vehicles, stored energy is used to provide the main power which provides the electrical current to one or a plurality of traction motors. A typical vehicle that utilizes this type of electric traction is a golf cart or battery powered electric car. In some conventional electric traction vehicles, having more than one source of energy is desirable, such as a stored energy unit and an internal combustion engine coupled to a generator. By having more than one source of energy, some optimizations in the design can allow for more efficient power production, thus allowing power to be used from different sources to come up with a more efficient system for traction. These types of vehicles are commonly referred to as hybrid electric vehicles (HEV). Series and Parallel HEV system designs are what is usually encountered.

In a typical electric vehicle, regenerative braking capability may be provided in addition to or instead of a mechanical braking system by configuring the electric traction motors to function as generators rather than motors, such that the flow of electrical power to the electric traction motors is reversed. In this regeneration mode, each of the electrical traction motors receives mechanical energy from the rotation of the wheel set coupled to the traction motor and operates as a generator to convert the mechanical energy to electrical energy and provide an electrical power output. This process of receiving mechanical energy from the wheels to operate the electrical traction motor as a generator absorbs mechanical energy and acts to reduce the speed of the vehicle. Additionally required braking force is typically provided by a mechanical brake.

The reverse flow of electrical power from the electrical traction motors is typically diverted to the stored energy device. If the diverted electrical power exceeds the capacity of the stored energy device, the excess electrical energy is typically diverted to an energy dissipation device or dynamic brake, such as a resistive element, and is dissipated as heat through the resistive element. Storing and dissipating excess electrical energy in this manner over a large number of braking cycles may decrease the useful life of the stored energy device, and the use of an additional energy dissipation system adds cost and complexity to the system depending on the required size. Further, high costs may be associated with using and maintaining a mechanical braking system, particularly on heavy-duty electric vehicles, such as fire trucks, military vehicles, refuse-handling vehicles, etc. Thus, there is need for a system and method for braking in an electric vehicle which utilizes an engine and generator combination to configured to provide additional braking capability and to dissipate excess energy during regenerative braking.

SUMMARY

According to an exemplary embodiment, an electric traction system for an electric vehicle includes an internal combustion engine and a generator coupled to the engine, a power bus coupled to the generator, a power storage unit coupled to the power bus, a drive controller coupled to an electric motor and to the power bus, and a vehicle controller coupled to the drive controller. The generator is configured to receive electrical power regenerated onto the power bus by the electric motor in order to provide mechanical power to the engine, and the engine is configured to dissipate the mechanical power in order to provide a braking function.

According to another exemplary embodiment, a method of providing braking in an electric vehicle includes providing an internal combustion engine and a generator coupled to the engine, providing a power bus coupled to the generator, providing a power storage unit coupled to the power bus, providing a drive controller coupled to an electric motor and to the power bus, and providing a vehicle controller coupled to the drive controller. The method also includes configuring the generator to receive electrical power regenerated onto the power bus by the electric motor in order to provide mechanical power to the engine, and configuring the engine to dissipate the mechanical power.

According to another exemplary embodiment, an electric traction vehicle includes a vehicle platform and a principal power unit mounted on the vehicle platform and comprising an engine and an AC generator coupled to the engine. The electric traction vehicle also includes an AC electric motor coupled to at least one wheel and supported relative to the vehicle platform, a drive controller coupled to the AC electric motor, a vehicle controller coupled to the drive controller, and an AC bus assembly to couple the principal power unit and the drive controller. The principal power unit is configured to receive power regenerated onto the AC bus assembly by the AC electric motor and to dissipate the power using the engine in order to provide a braking function.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

Before turning to the FIGURES which illustrate the exemplary embodiments in detail, it should be understood that the invention is not limited to the details or methodology set forth in the following description or illustrated in the FIGURES. The invention is capable of other embodiments or being practiced or carried out in various ways. It should also be understood that the phraseology and terminology employed herein is for the purpose of description only and should not be regarded as limiting.

In general, the system and method described herein for providing braking capability in an electric vehicle includes the use of a combination of an engine and a generator to provide additional braking capability and to dissipate excess energy during regenerative braking. Power is dissipated through the engine and generator by configuring the generator to operate as a motor (i.e., "motoring" the generator) such that the flow of electrical power from the generator is reversed and the generator provides mechanical torque to the engine, which engine functions as an air compressor in the manner of a conventional engine brake or "jake brake." Using the combination of the engine and generator to provide additional braking capability may reduce wear on a mechanical braking system used in combination with regenerative braking, thereby reducing the cost associated with maintaining the mechanical braking system. Using the combination of the engine and generator to dissipate excess regenerated energy during regenerative braking may reduce the size of or eliminate the need for an additional energy dissipation device, thereby reducing the costs associated with additional energy dissipation systems.

Figure 1:
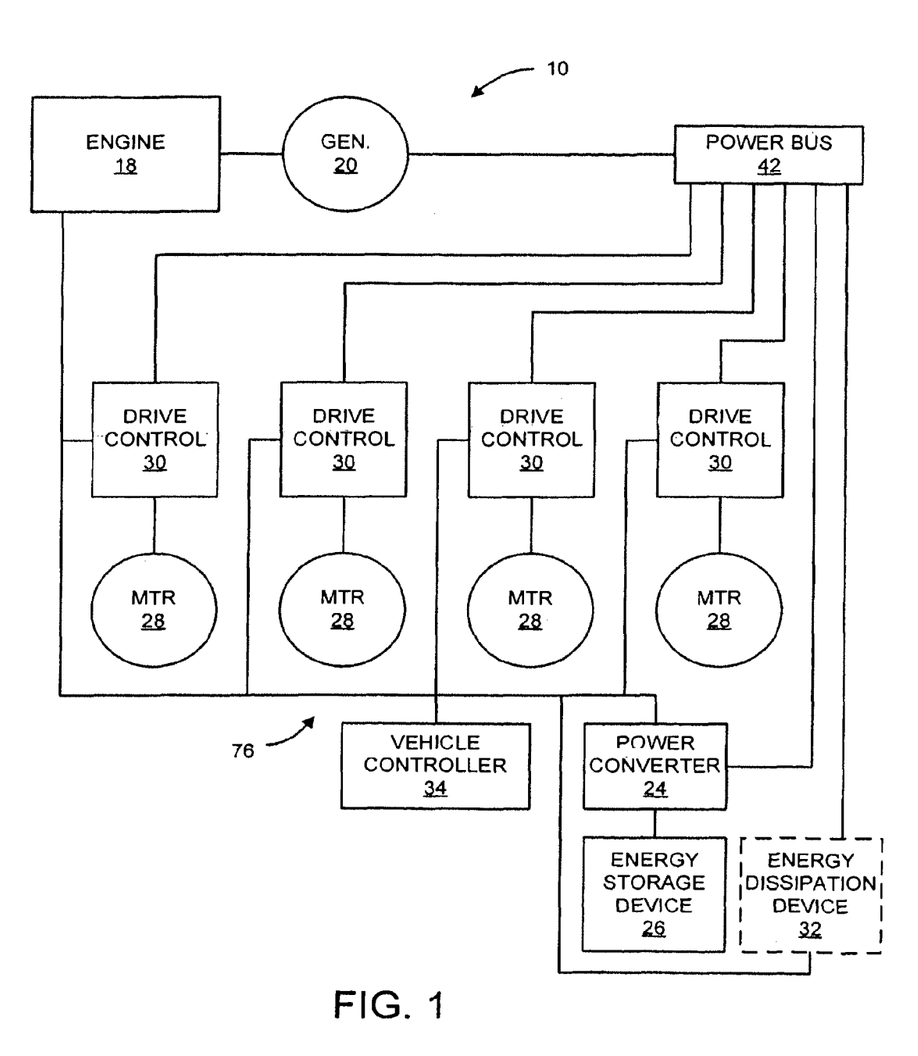
FIG. 1 is a schematic diagram of an electric traction vehicle according to an exemplary embodiment.

FIG. 1 is a schematic diagram of an electric traction vehicle 10 according to an exemplary embodiment. An electric traction vehicle is a vehicle that uses electricity in some form or another to provide all or part of the propulsion power of the vehicle. This electricity can come from a variety of sources, such as stored energy devices relying on chemical conversions (batteries), stored electrical charge devices (capacitors), stored energy devices relying on mechanical stored energy (e.g. flywheels, pressure accumulators), and energy conversion products. A hybrid electric vehicle is an electric traction vehicle that uses more than one sources of energy, such as one of the electrical energy storage devices mentioned above and another source, such as an internal combustion engine. By having more than one source of energy some optimizations in the design can allow for more efficient power production, thus one can use power from different sources to come up with a more efficient system for traction. The electric traction vehicle 10 can be used to implement electric vehicles in general and/or hybrid electric vehicles in particular. The electric traction vehicle 10 can implement a number of different vehicle types, such as a fire-fighting vehicle, military vehicle, snow blower vehicle, refuse handling vehicle, concrete mixing vehicle, etc.

In the illustrated embodiment, the electric traction vehicle 10 includes an engine 18, a generator 20, an electric power converter 24, an energy storage device 26, a plurality of electric motors 28, a plurality of drive controllers 30, a vehicle controller 34. Electric traction vehicle 10 optionally includes an energy dissipation unit 32. The generator 20, the drive controllers 30, and the electric power converter 24 are interconnected by a power bus 42, such as an AC or DC power bus. Electric traction vehicle 10 is generally configured to use a combination of the engine 18 and the generator 20 to provide braking capability and to dissipate excess electrical power generated by the electric motors 28 during regenerative braking.

The engine 18 is preferably an internal combustion engine, such as a diesel engine configured to both provide mechanical power to the generator 20 and to receive mechanical power from generator such that may function as a mechanical engine brake or air compressor. The generator 120 is coupled to the engine 18 and may be configured to function as both generator configured to provide AC or DC power, and as a motor configured to receive electrical power and provide mechanical power to the engine 18.

The electric power converter 24 is coupled to the energy storage device 26 and is configured to convert the electrical power generated by the generator 20, or by the electric motors 28 during regenerative braking, to the energy mode required by the energy storage device 26. For example, according to an exemplary embodiment, the electric power converter is configured to convert AC power generated by the generator 20 to DC power and transfer such converted power to the storage device 26. The electric power converter 24 may also convert the energy stored in the energy storage device 26 back to the energy mode of generator 20 to augment and supplement the power generated by generator 20 over the power bus 42. The energy storage device 26 may be electric capacitors, electrochemical capacitors or "ultracapacitors," storage batteries, a flywheel, or hydraulic accumulators.

The electric motors 28 are appropriately sized electric traction motors, which may be AC or DC electric motors. The electric motors 28 are configured to receive electrical power from the power bus 42 in order to provide a mechanical energy output to a wheel or axle. The electric motors 28 are also configured to receive mechanical energy from the wheel or axle during regenerative braking in order to generate electrical power onto the power bus 42.

The drive controllers 30 are coupled to each electric motor 28 and are configured to control the operation of each electric motor 28. More specifically, the drive controllers are configured to allow the electric motors 28 to either receive electrical power from the power bus 42 in order to provide a mechanical energy output to a wheel or axle, or to receive mechanical energy from the wheel or axle during regenerative braking in order to generate electrical power onto the power bus 42.

The vehicle controller 34 is coupled to the engine 18, the generator 20, the electric power converter 24, and the drive controllers 30 via a data bus network 76. The vehicle controller 34 is generally configured to control the operation of the engine 18, the generator 20, the electric power converter 24, the energy storage device 26, the plurality of electric motors 28, and the plurality of drive controllers 30. More specifically, the vehicle controller 34 is configured to assist in controlling the distribution of electrical power on the power bus so that the flow of electrical power from generator 20 and engine 18 may be reversed to provide braking capability, and so that excess electrical power generated by the electric motors 28 during regenerative braking is routed back to the generator 20 so that it may be dissipated through engine 18.

The optional energy dissipation unit 32 is typically a resistive element through which electrical power generated by the electric motors 28 during regenerative braking is dissipated as heat if the electrical power exceeds the capacity of the energy storage device 26. Preferably, electric traction vehicle 10 is configured such that the excess electrical power generated by the electric motors 28 during regenerative braking is sufficiently dissipated through engine 18 and generator 20.

According to an exemplary embodiment, in order to retard or slow the forward motion of the electric traction vehicle 10, the vehicle controller 34 provides signals to the engine 18, the generator 20, and the drive controllers 30 so that generator 20 switches from receiving mechanical power from the engine 18 and providing electrical power onto the power bus 42 (i.e., functioning as a generator) to receiving electrical power from the power bus 42 and providing mechanical power to the engine 18 (i.e., functioning as a motor). The electric motors 28 switch from functioning as motors to functioning as generators, and instead of providing a mechanical torque output, each of the electric motors 28 now receives mechanical energy from the rotation of, for example, a wheel set or axle coupled to the electric motor 28. The electric motors 28 now convert the mechanical energy to electrical energy and provide an electrical power output onto the power bus 42. The fuel supply to the engine 18 is shut off during braking, and the engine switches from providing mechanical power to the generator 20 to receiving mechanical power from the generator 20 such that it now functions as a mechanical engine brake or air compressor in order to dissipate the received mechanical power (e.g., as heat). According to an exemplary embodiment, electric traction vehicle 10 is configured to utilize an engine braking user interface such as those used for conventional mechanical engine braking or "jake brake" systems in conjunction with vehicle controller 34. According to another exemplary embodiment, the user interface allows the user to adjust the amount of power that can be dissipated through the engine 18 when it is used to provide braking.

During normal regenerative braking, vehicle controller 34 provides each of the drive controllers 30 with a positive speed reference signal and a negative torque reference signal such that the direction of flow of electric power to the electric motors 28 is reversed. The electric motors 28 switch from functioning as motors to functioning as generators, and instead of providing a mechanical torque output, each of the electric motors 28 now receives mechanical energy from the rotation of, for example, a wheel set or axle coupled to the electric motor 28. The electric motors 28 now convert the mechanical energy to electrical energy and provide an electrical power output onto the power bus 42.

The electrical power provided by the electric motors 28 onto the power bus 42 is diverted to the energy storage device 26. If the diverted electrical power exceeds the capacity of the energy storage device 26, the excess electrical energy is diverted to the generator 20. The generator 20 switches from receiving mechanical power from the engine 18 and providing electrical power onto the power bus 42 (i.e., functioning as a generator) to receiving electrical power from the power bus 42 and providing mechanical power to the engine 18 (i.e., functioning as a motor). The fuel supply to the engine 18 is shut off during braking, and the engine switches from providing mechanical power to the generator 20 to receiving mechanical power from the generator 20 such that it now functions as a mechanical engine brake or air compressor in order to dissipate the received mechanical power (e.g., as heat).

Figure 2:
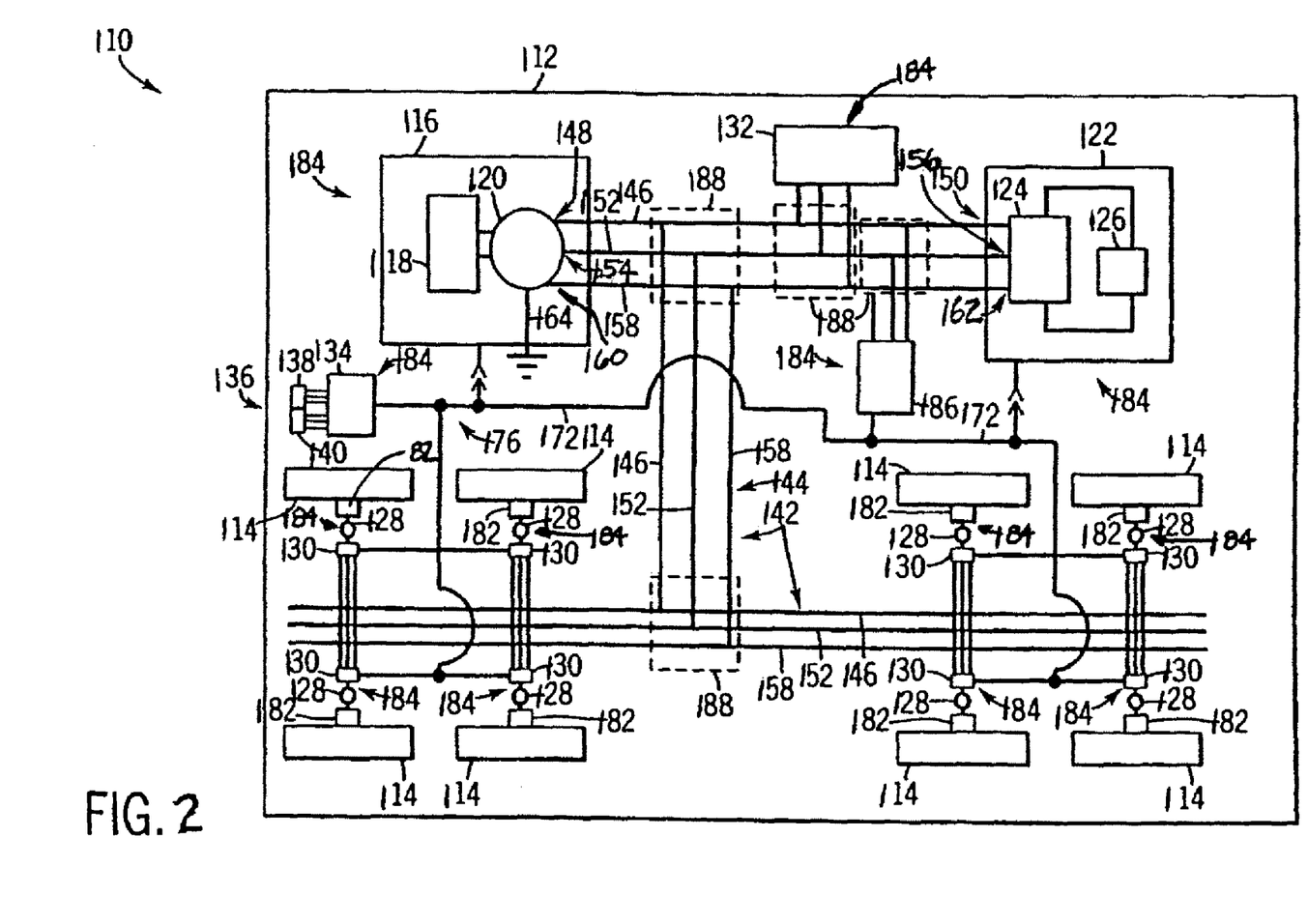
FIG. 2 is a schematic diagram of an exemplary embodiment of an electric traction vehicle providing an exemplary embodiment of an AC bus assembly coupled to various modules on the vehicle.

According to an exemplary embodiment, the system and method for providing braking capability in an electric vehicle is implemented in an electric traction vehicle that utilizes an AC bus assembly to distribute excess AC electrical power to and from AC electric motors and an AC generator coupled to an engine. FIG. 2 is a schematic diagram illustrating an electric traction vehicle 110 which is an embodiment electric traction vehicle 10 that utilizes an AC bus assembly coupled to various modules on the vehicle. In the illustrated embodiment, electric traction vehicle 110 includes a vehicle platform or vehicle support structure 112 upon which various modules 184 are removably mounted. Such modules 184 include a principal power unit 116, a power storage unit 122, an electric motor 128 coupled to at least one wheel 114 of the vehicle 110, a drive controller 130 coupled to the electric motor 128, and a vehicle controller 134 having a user interface 136. Additional modules 184, generally referred to as auxiliary modules 186, can be added to the electric traction vehicle 110 as circumstances and the situation warrants. For example, electric traction vehicle 110 may optionally include an energy dissipation unit 132.

Interconnecting the modules 184 on the electric traction vehicle 110 is an AC power bus assembly 142 and a data bus network 176 through which the vehicle and its various functions are controlled and operated. Specific descriptions of the various modules 184 and their functions will be provided hereinafter.

One embodiment of electric traction vehicle 110 comprises the vehicle platform 112 with a principal power unit 116 mounted on the vehicle platform 112. A power storage unit is mounted on the vehicle platform with a plurality of wheels, rotatably mounted on the vehicle platform 112 with an electric motor 128 coupled to at least one wheel 114. A drive controller 130 is coupled to the electric motor 128. A vehicle controller 134 having an input terminal 138 and an output terminal 140 is coupled to the drive controller 130 and the data bus network 176. The vehicle controller 134 receives data input from monitors and sensors, as well as from the operator input terminal 138, concerning the speed and power required for operation of electric traction vehicle 110. The torque output of each motor 128 is adjusted to meet the requirements established in the vehicle controller 134 from such data input. Coupling the principal power unit 116, the power storage unit 122, and the electric motor 128 through the drive controller 130 is an AC bus assembly 142. In some instances, the vehicle controller 134 is coupled to one of the principal power units 116 and the power storage unit 122 as determined by an operator of the electronic traction vehicle 110. A continuous track, supported by the wheels 114 can also be provided.

The electric traction vehicle 110 can be configured with one or more modules 184 consisting of modular independent coil spring suspensions for steerable and non-steerable wheel assemblies and driven and non-driven axles. Details of such modular independent coil spring suspensions can be found in U.S. Pat. Nos. 5,538,274, 5,820,150 and 6,105,984, which are hereby incorporated by reference, and which are assigned to the assignee of the present invention.

The principal power unit 116 includes a prime mover or engine 118 coupled to a generator or alternator 120. The prime mover 118 is preferably an internal combustion engine, such as a diesel engine configured to function as a mechanical engine brake. The generator or alternator 120 is coupled to the prime mover and preferably is a synchronous generator producing 460 to 480 volts, three phase, AC 60 hertz power for the electric traction vehicle 110. However, it is contemplated that different sized generators or alternators can be coupled to the prime mover for purposes of generating either higher or lower electrical power. For instance, a single phase system can be utilized, or a system that generates 720 volts can be used, or a system that operates at a frequency other than 60 hertz, such as 50 hertz, which is typical in European countries. It is also contemplated that the power generated by the principal power unit 116 can be modified by appropriate auxiliary modules 186, such as a step-down transformer to provide power to operate ancillary equipment on or associated with the electric traction vehicle 110, such as pumps, instruments, tools, lights and other equipment.

Various embodiments of the electric traction vehicle 100 are based on the number of wheels 114 that are driven on the electric traction vehicle 110. For instance, an embodiment includes an electric motor 128 and drive controller 130 coupled to another wheel 114 and coupled to the data bus network 176 and the AC bus assembly 142. The electric traction vehicle 110 can also include four electric motors 128 and four drive controllers 130 which are coupled to four wheels 114 and coupled to the data bus network 176 and the AC bus assembly 142. As shown in FIG. 2, eight electric motors 128 and electric drive controllers 130 can be coupled to eight separate wheels 114 and coupled to the data bus network 176 and the AC bus assembly 142. In all variants of the electronic traction vehicle 110, at least two of the wheels 114 are steerable.

The AC bus assembly 142 includes a plurality of phase conductors 144. A conductor 146 having an end 148 and an end 150 together with a conductor 152 having an end 154 and an end 156 can be configured together with a neutral 164 to provide single phase power in one embodiment of the electric traction vehicle 110. A conductor 158 having an end 160 and an end 162 can be used in conjunction with the conductor 146 and the conductor 152 to provide three phase power as shown in FIG. 2. The conductors 144 can be stranded metal wire such as copper or aluminum sized and clad to transmit the power generation contemplated in the design of electric traction vehicle 110. The conductors 144 can also be solid metal bars, generally referred to as bus bars, composed of appropriately clad metals, such as copper or aluminum, as will be appreciated by one ordinarily skilled in the art.

The electric motor 128 can be an appropriately sized traction motor. According to an exemplary embodiment, electric traction vehicle 110 includes an AC, three phase induction electric motor. Preferably, electric motor 128 has a simple cast rotor, machine mount stator, sealed ball bearings, and no brushes, internal switches or sliding contact devices, such that the rotor as the only moving part of the electric motor 128. Control of the electric motor 128 is achieved through a drive controller 130 which is coupled to the electric motor 128. According to an exemplary embodiment, the drive controller is an inverter, such as an AC-to-AC inverter. The torque output of the electric motor 128 is adjusted based on the rotational speed and power requirements established by the operator at the vehicle controller 134 and transmitted to the drive controller 130 over the data bus network 176. The drive controller 130 is coupled by a data bus 172 into the data bus network 176, which is connected to the vehicle controller 134. Signals generated by the vehicle controller 134, the drive controller 130, and other modules and sensors including auxiliary modules 186 are processed by the vehicle controller 134 with appropriate inputs and outputs provided by the user interface 136. It is also contemplated that wireless communication between the vehicle controller 134 and the various modules 184 can be achieved including communication of signals via radio waves, microwaves, and fiber optical paths including relay via satellite to a central command center.

Figure 3:
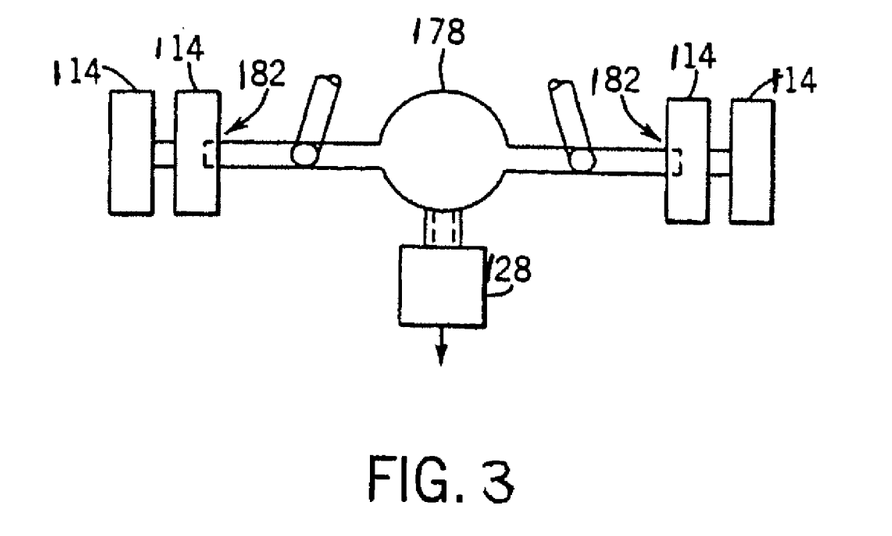
FIG. 3 is a top plan view illustration of an exemplary embodiment of a differential assembly coupled to an electric motor for driving at least two wheels and supported by a suspension assembly.
Figure 4:
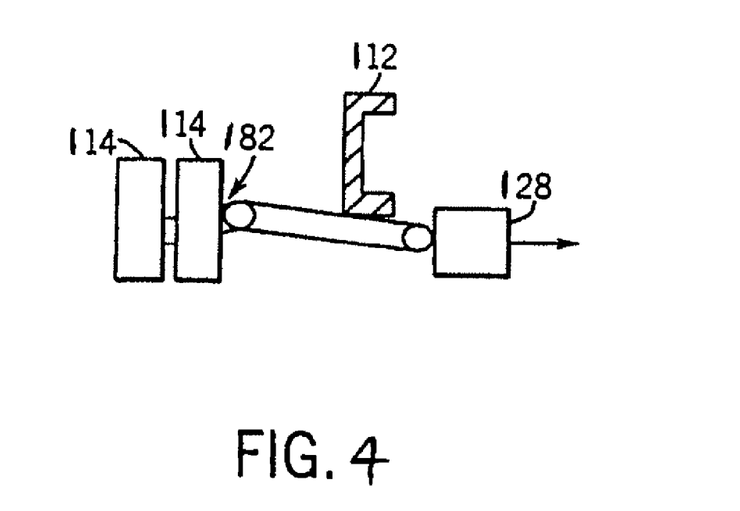
FIG. 4 is an end view partial sectional view of an exemplary embodiment of an electric traction vehicle support structure coupled to a suspension assembly which suspends at least one wheel relative to the vehicle support structure.

FIGS. 2 and 4 illustrate the wheels 114 being driven directly by an electric motor 128 through an appropriate wheel-end reduction assembly 182 if necessary. As shown in FIG. 3, a wheel-end reduction assembly 182 can also couple the wheels 114 to a differential assembly 178 via drive shafts. A plurality of wheel-end reduction assemblies 182 can couple the wheels 114 to their respective electric motors 128. Another embodiment of the vehicle 110 includes a differential assembly 178 coupled to the electric motor 128 for driving at least two wheels 114 as shown in FIG. 3. Additional differential assemblies 178, such as three assemblies 178, with each differential assembly coupled to an electric motor 128 for driving at least two wheels, can also be included in the electric traction vehicle 110.

As mentioned above, the electric traction vehicle 110 can be provided with the principal power unit 116, the power storage unit 122, the electric motor 128, the drive controller 130, the vehicle controller 134, the suspension assemblies and other associated equipment as modules 184 that may be removably mounted on the vehicle platform. The modules 184 are also removably connected to the data bus network 176 and the AC bus assembly 142. An auxiliary module 186 can be any type of equipment or tool required or associated with the function and operation of the electric traction vehicle 110. For example, the auxiliary module can be a pump, a saw, a drill, a light, etc. The auxiliary module 186 is removably connected to the data bus network 176 and the AC bus assembly 142. A junction 188 is used to facilitate the connection of the modules to the data bus network 176 and the AC power bus assembly 142 and are located at convenient locations throughout the vehicle 110. The junctions 188 can accommodate various types of connections such as quick connectors, nuts and bolts, solder terminals, or clip terminals or the like. The junction 188 can accommodate the data bus 172 or the phase conductor 144 or both.

Also connected to the AC power bus assembly 142 is the power storage unit 122. The power storage unit 122 includes an electric power converter 124 and an energy storage device 126. The energy storage unit 122 can be configured to provide electric power above and beyond that required of the principal power unit 116. The energy storage device 126 can be electric capacitors, electrochemical capacitors or "ultracapacitors," storage batteries, a flywheel, or hydraulic accumulators. The electric power converter 124 can be configured to convert the AC power generated by the principal power unit 116 to DC power and transfer such converted power to an appropriate storage device. The electric power converter 124 can also convert the energy stored in the energy storage device 126 back to AC power to augment and supplement the AC power generated by the principal power unit 116 over the AC power bus assembly 142. Applicants have determined that an additional 200-300 horse power of short-term power can be provided into the AC power bus assembly 142 over the phase conductors 144 by discharge of an on-board battery pack (energy storage device 126) under control of the power storage unit 122. The power storage unit 122 may be coupled to the data bus network 176 and controlled by the vehicle controller 134. The combined electrical power from the principal power unit 116 and the power storage unit 122 will all be available on the AC power bus assembly 142 for use by the electric motors 128 or by any other module 184 or auxiliary module 186 as determined by the operator at the user interface 136 of the vehicle controller 134.

In operation, the power storage unit 122 receives power from the principal power unit 116 over conductors 144 of the AC power bus assembly 142. The power received is converted into the appropriate energy mode required by the energy storage device 126 and maintained in the energy storage device 126 until required during the operation of the electric traction vehicle 110. If the principal power unit 116 is not functioning for any reason, the energy in the power storage unit can be utilized to operate, for a given period of time, the electric traction vehicle 110 or any of the modules 184 or auxiliary modules 186 mounted on the electric traction vehicle 110.

Energy storage recharge of the power storage unit 122 by the principal power unit 116 will begin automatically and immediately after the vehicle 110 arrives at its destination and will continue during the vehicle's return run to its original location. The state of charge of the power storage unit 122 will be maintained between missions by a simple plug connection to a power receptacle in the vehicle's garage or storage location, which receptacle will automatically disconnect as the electric traction vehicle 110 leaves such site. The power storage unit 122 can also receive energy generated by the electric motors 128 when the electric motors 128 are configured in a regeneration mode in which case they will function as a generator. Such functionality is utilized in a braking procedure for the vehicle as determined by the operator at the user interface 136 of the vehicle controller 134. The electric motor 128 and AC power bus assembly 142 are also be configured to regenerate power back to the principal power unit 116 to provide braking capability as described above with reference to FIG. 1. Preferably, vehicle controller 134 and drive controllers 130 are configured to regulate the power factor on AC bus assembly during regeneration.

An additional module 184 that may be provided in another embodiment of the vehicle 110 is an energy dissipation unit 132 coupled to the AC bus assembly 42 and the data bus network 176. If it is determined that the principal power unit 116 or the electric motors 128 or any other auxiliary module 186 generating too much power or are not utilizing sufficient power, the excess power can be dissipated through the energy dissipation device 132. An example of an energy dissipation device 132 is a resistive coil that may be additionally cooled by fans or an appropriate fluid. Another example of an energy dissipation unit 132 is a steam generator which utilizes excess heat generated in the vehicle to heat water to produce steam. Preferably, energy dissipation device 132 is replaced or supplemented by configuring the generator or alternator 120 to function as a motor and using the engine 118 as an air pump or compressor to dissipate the excess power as described above with reference to FIG. 1.

The foregoing description of embodiments has been presented for purposes of illustration and description. It is not intended to be exhaustive or to be limited to the precise forms disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. An AC bus assembly on a vehicle having an engine, an AC generator coupled to the engine, a drive controller, an AC electric motor coupled to the drive controller, and a power storage unit, the AC bus assembly comprising:
    a first end coupled to the generator;
    a second end coupled to the drive controller; and
    a third end configured to couple to a power receptacle off-board of the vehicle,
    wherein the AC bus is configured to carry power from the third end configured to couple to a power receptacle off-board of the vehicle to the power storage unit;
    wherein the AC bus is further configured to carry power regenerated by the electric motor from the drive controller to the generator, the generator is configured to provide mechanical power to the engine, and the engine is configured to dissipate the mechanical power in order to provide a braking function.

2. The AC bus assembly of claim 1, wherein the AC bus is configured to carry three-phase power.

3. The AC bus assembly of claim 2, wherein the AC bus is configured to carry substantially 460 to 480 volts or substantially 720 volts at substantially 50 or substantially 60 hertz.

4. The AC bus assembly of claim 1, further comprising a fourth end coupled to the power storage unit.

5. The AC bus assembly of claim 4, wherein the power storage unit comprises at least one capacitor.

6. The AC bus assembly of claim 1, further comprising a fourth end coupled to an auxiliary module;
    wherein the auxiliary module is one of a pump, a drill, a saw, and a light.

7. The AC bus assembly of claim 1, wherein the drive controller comprises an AC-to-AC inverter.

8. The AC bus assembly of claim 1, further comprising a fourth end coupled to an energy dissipation device comprising a resistance coil.

\* \* \* \* \*